(12) United States Patent
Koh et al.

(10) Patent No.: US 8,032,780 B2
(45) Date of Patent: Oct. 4, 2011

(54) VIRTUALIZATION BASED HIGH AVAILABILITY CLUSTER SYSTEM AND METHOD FOR MANAGING FAILURE IN VIRTUALIZATION BASED HIGH AVAILABILITY CLUSTER SYSTEM

(75) Inventors: Kwang-Won Koh, Daejeon (KR); Seungjo Bae, Daejeon (KR); Jin Mee Kim, Daejeon (KR); Young-Woo Jung, Daejeon (KR); Young Choon Woo, Daejeon (KR); Myung-Joon Kim, Daejeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 147 days.

(21) Appl. No.: 12/517,067

(22) PCT Filed: Nov. 26, 2007

(86) PCT No.: PCT/KR2007/005983
§ 371 (c)(1),
(2), (4) Date: May 30, 2009

(87) PCT Pub. No.: WO2008/069481
PCT Pub. Date: Jun. 12, 2008

(65) Prior Publication Data
US 2010/0077250 A1  Mar. 25, 2010

(30) Foreign Application Priority Data

Dec. 4, 2006  (KR) .................. 10-2006-0121385
Oct. 23, 2007  (KR) .................. 10-2007-0106754

(51) Int. Cl.
*G06F 11/00* (2006.01)
(52) U.S. Cl. ..................................... 714/4.11; 714/4.12
(58) Field of Classification Search ................. None
See application file for complete search history.

(56) References Cited

U.S. PATENT DOCUMENTS

| 6,609,213 | B1* | 8/2003 | Nguyen et al. | 714/4 |
| 2003/0018927 | A1* | 1/2003 | Gadir et al. | 714/4 |
| 2004/0221193 | A1* | 11/2004 | Armstrong et al. | 714/10 |
| 2008/0126854 | A1* | 5/2008 | Anderson et al. | 714/13 |
| 2009/0106586 | A1* | 4/2009 | Armstrong et al. | 714/13 |

OTHER PUBLICATIONS

International Search Report for application of PCT/KR2007/005983 filed on Nov. 26, 2007.

* cited by examiner

*Primary Examiner* — Michael Maskulinski

(57) ABSTRACT

Provided are a virtualization based high availability cluster system and a method for managing failures in a virtualization based high availability cluster system. The high availability cluster system includes a plurality of virtual nodes, and a plurality of physical nodes each including a message generator for generating a message denoting that the virtual nodes are in a normal state and transmitting the generated message to virtual nodes in a same physical node. One of the virtual nodes not included in a first physical node among the plurality of the physical nodes takes over resources related to a service if a failure is generated in one of virtual nodes included in the first physical node.

5 Claims, 5 Drawing Sheets

[Fig. 1]
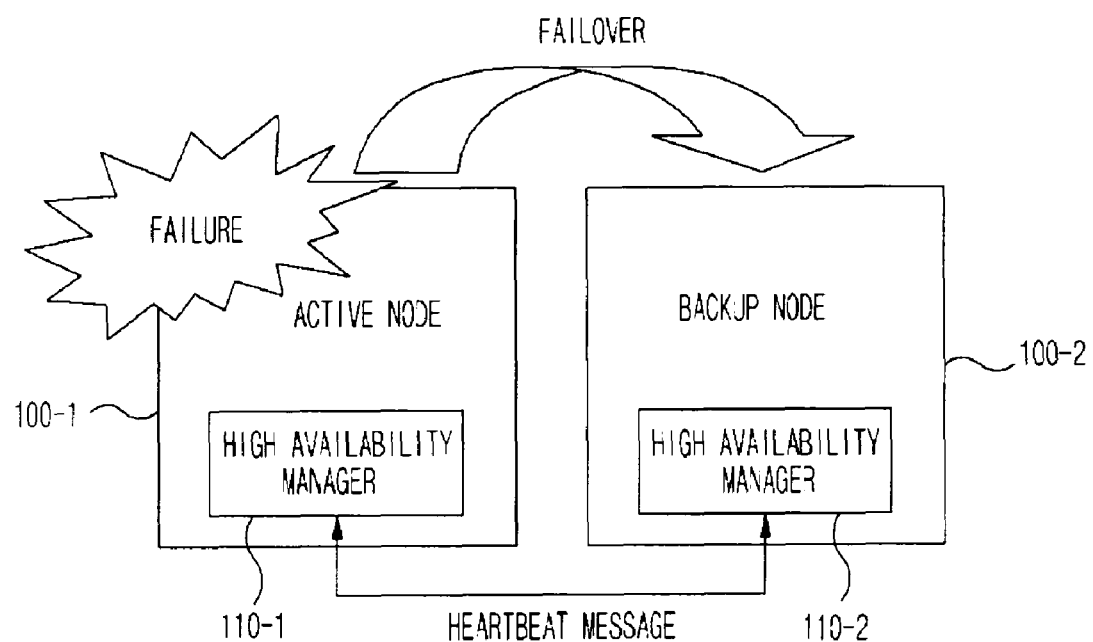

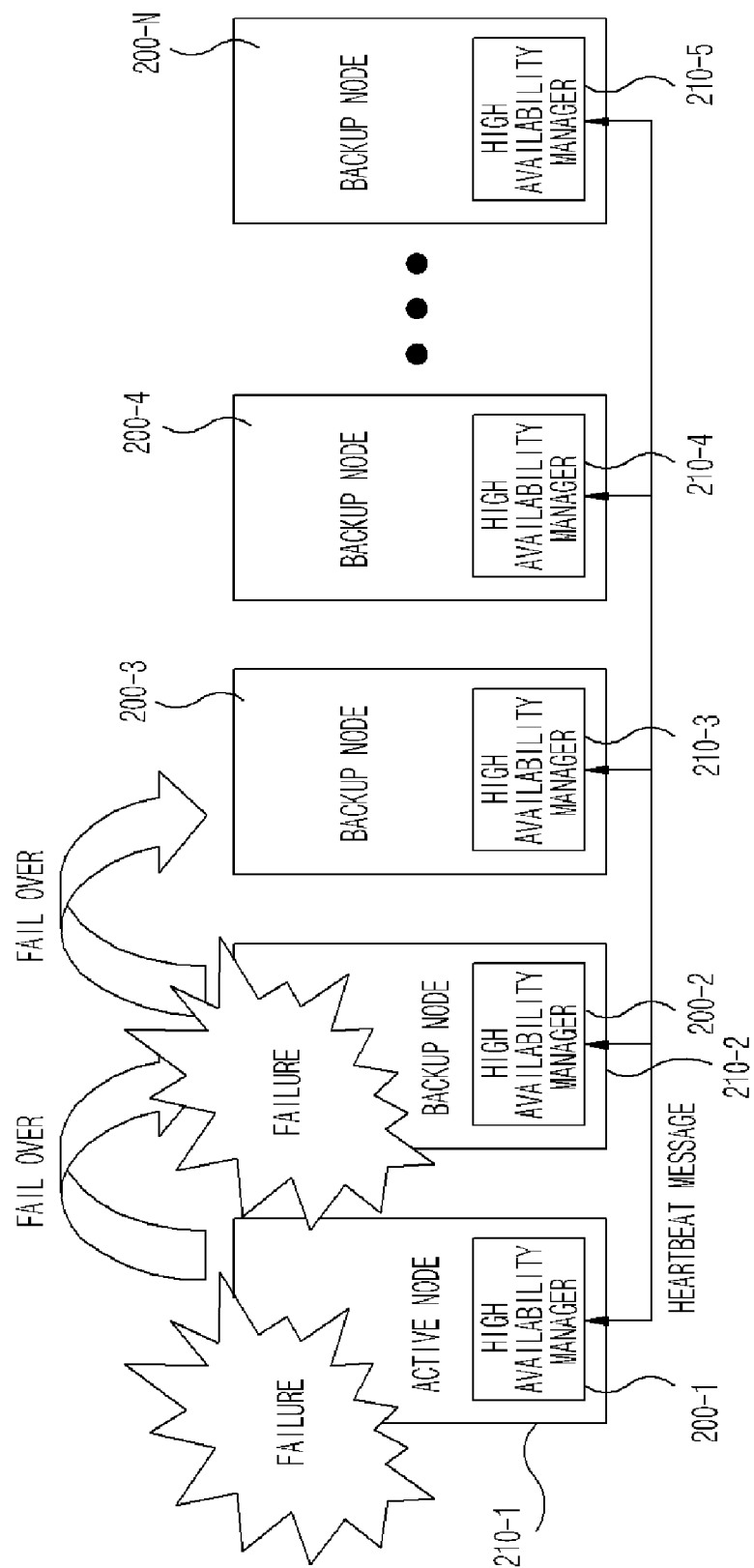
[Fig. 2]

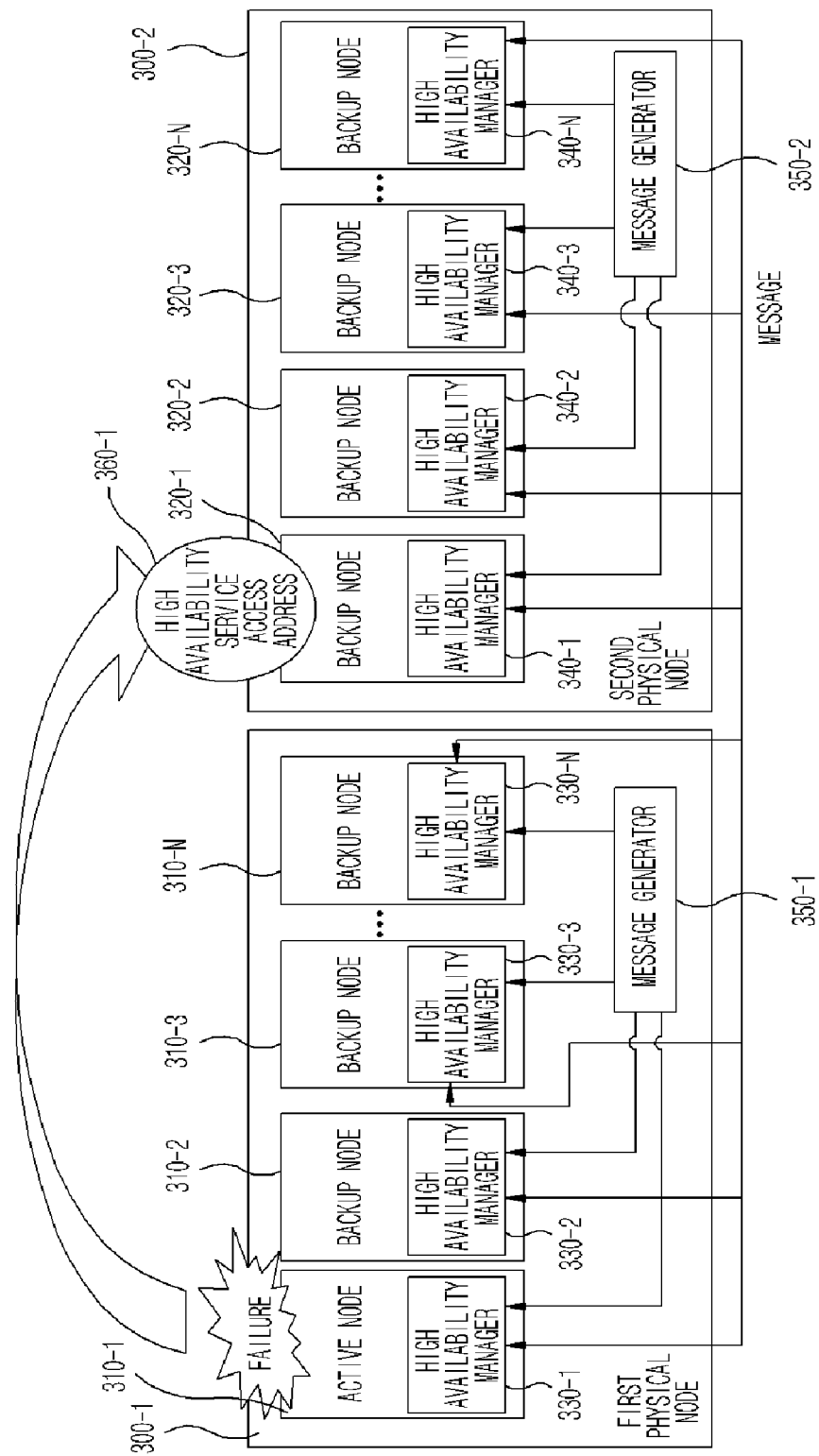

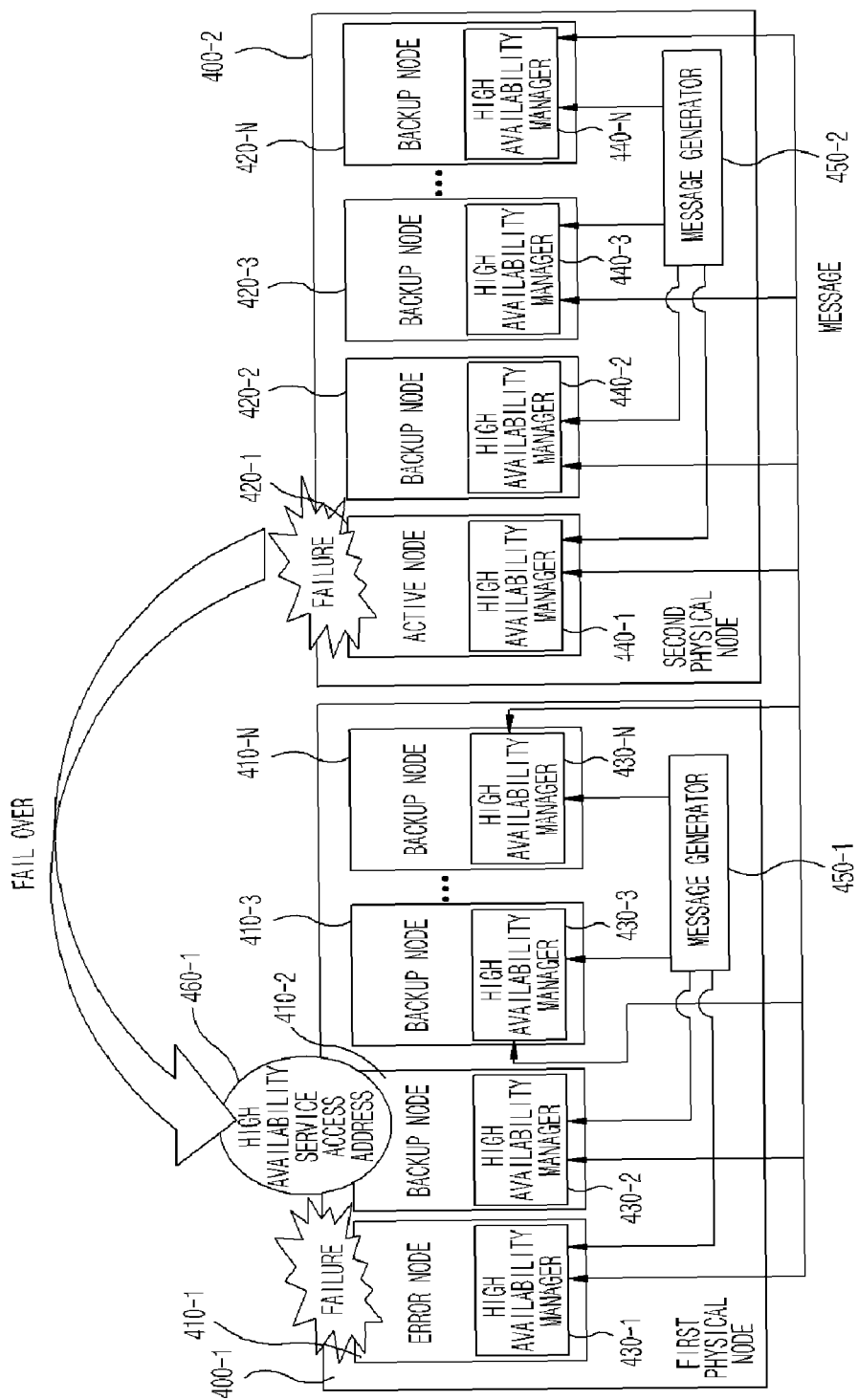
[Fig. 4]

[Fig. 5]
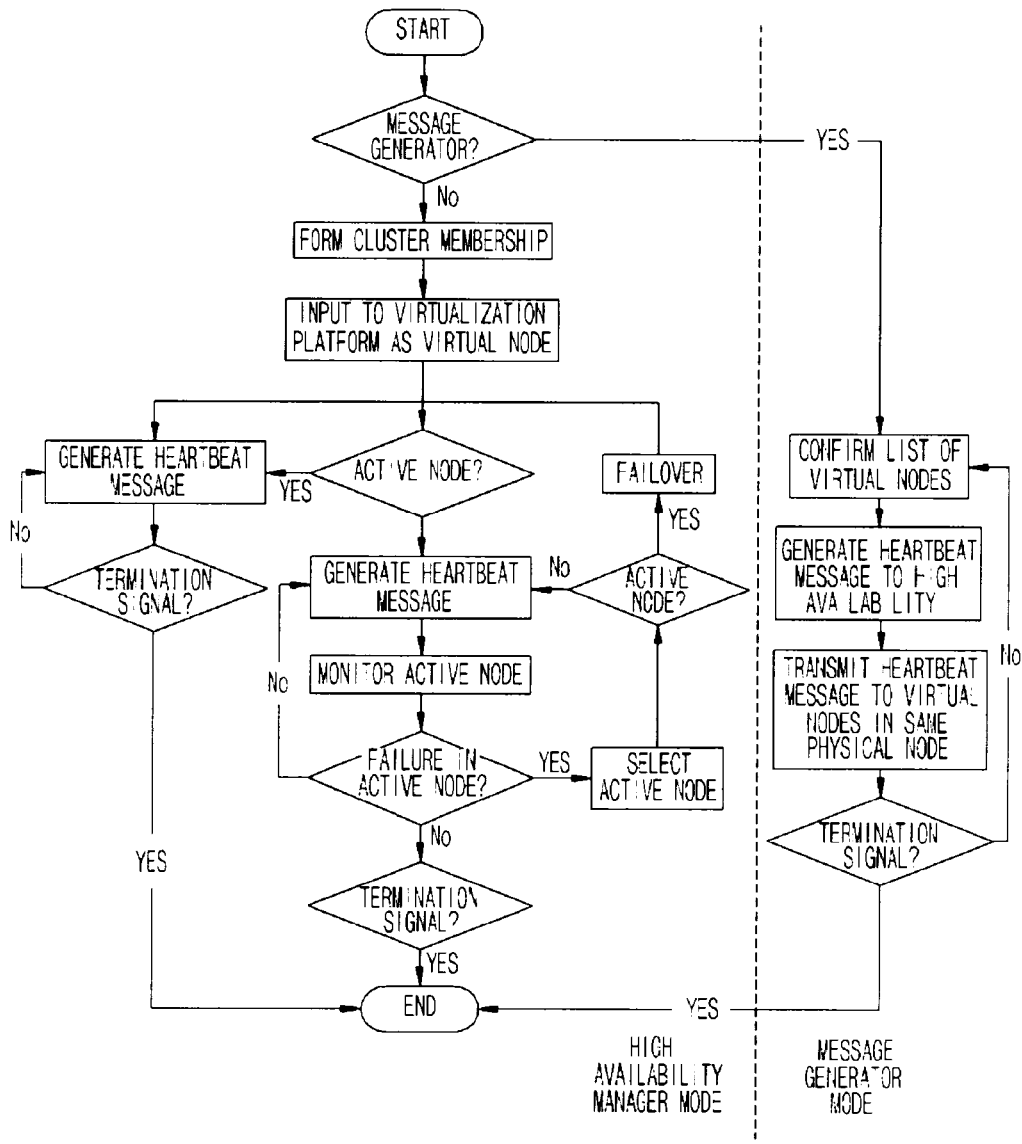

VIRTUALIZATION BASED HIGH AVAILABILITY CLUSTER SYSTEM AND METHOD FOR MANAGING FAILURE IN VIRTUALIZATION BASED HIGH AVAILABILITY CLUSTER SYSTEM

TECHNICAL FIELD

The present invention relates to a virtualization based high availability cluster system and a method for managing failures in a virtualization based high availability cluster system.

This work was partly supported by the Information Technology (IT) research and development program of the Korean Ministry of Information and Communication (MIC) and/or the Korean Institute for Information Technology Advancement (IITA) [2006-S-035-01, "the development of open software based virtual infra embodiment technology for distributed heterogeneous server environment"].

BACKGROUND ART

A virtualization based system provides a plurality of virtual nodes through virtualizing a physical node. That is, the virtualization based system improves the utilization of resources by dynamically allocating and releasing resources to/from a corresponding node according workload of a virtual node, which varies according to the abrupt change of business. In order to dynamically allocate and release resources, a physical node is divided into a plurality of virtual nodes through a virtual platform.

A high availability system improves the safety of a service that is directly provided to target users through an Internet or a cellular network according to a type of company operation or a type of business. In general, contents for a corresponding service are clustered through N nodes that are shared through a sharing storage.

Such a high availability clustering system generally provides an active/backup node structure by connecting two servers. The backup node monitors the active node while the active node occupies resources and provides services based on the occupied resources. Here, if failures are generated in the active node, the backup nodes takes over the resources of the active node and continuously provides a corresponding service based on the resources. As described above, the seamless service can be provided to a target user through such an active/backup node structure.

Hereinafter, a 1+1 high availability system according to the related art will be described with reference to FIG. 1.

As shown in FIG. 1, the 1+1 high availability system includes one active node 100-1 which is a server for providing a service and a backup node 100-2 for monitoring the active node 100-1.

The active node 100-1 and the backup node 100-2 include high availability managers 110-1 and 110-2, respectively. The high availability manager 110-1 of the active node 100-1 transmits a state of the active node 100-1 as a form of a HEARTBEAT message to the backup node 100-2 at a regular interval in order to inform the high availability manager 110-2 that the active node 100-1 successfully provides a service.

If the backup node 100-2 is informed that failures are generated in the active node 100-1, the backup node 100-2 determines that failures are generated in the active node 100-1 and performs a failover process for taking over the resources of a service that the active node 100-1 provides.

However, the 1+1 high availability system has availability limitation because the 1+1 high availability system cannot continuously provide a corresponding service if failures are generated in a backup node. Also, the 1+1 high availability clustering system constituted of two servers cannot form a multiple backup system which is required according to the importance of business. Therefore, it is difficult to apply the 1+1 high availability clustering system to a communication equipment server that forms a multi-level high availability system.

Hereinafter, a 1+m high availability system according to the related art will be described with reference to FIG. 2.

As shown in FIG. 2, the 1+m high availability system includes one active node 200-1 and (N-1) backup node 200-2 to 200-N. The active node 200-1 and the backup nodes 200-2 to 200-N include high availability managers 210-1 to 210-N for generating and transmitting a HEARTBEAT message that informs the state of each system.

For example, if a failure is generated in the active node 200-1, all of the backup nodes 200-2 to 200-N vote to select a backup node that will perform a failover process for taking over the resources of a corresponding service by transiting a state of the selected backup node as an active node. The selected backup node takes over the resources of a service that was provided by the active node 200-1.

However, the 1+m high availability system constantly generates a HEARTBEAT message to enable all of nodes to share cluster membership information although the 1+m high availability system provide better high availability than the 1+1 high availability system because the 1+m high availability system include (N-1) backup nodes. The constant generation of the HEARTBEAT messages causes the increase of cluster nodes, thereby generating the large amount of overhead for processing the HEARTBEAT message at a network and at each of nodes. Also, the utilization of resources deteriorates in the backup nodes except the active node, and the management cost increases due to the increment of nodes that do not provide actual services.

DISCLOSURE OF INVENTION

Technical Problem

Accordingly, the present invention is directed to a virtualization based high availability cluster system and a method for managing failures in a virtualization based high availability cluster system, which substantially obviates one or more problems due to limitations and disadvantages of the related art.

It is an object of the present invention to provide a high availability clustering system for continuously providing a seamless service by effectively managing failures in a virtual node and a method for managing failures generated in a high availability cluster system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, there is provided a high availability cluster system including: a plurality of virtual nodes; and a plurality of physical nodes each including a message generator for generating a message denoting that the virtual nodes are in a normal state and transmitting the generated message to virtual nodes in a same physical node, wherein one of the virtual nodes not included in a first physical node among the plurality of the physical nodes takes over resources related to a service if a failure is generated in one of virtual nodes included in the first physical node.

In accordance with another purpose of the invention, there is provided a method for managing failure in a high availability cluster system including the steps of: generating a failure in a first virtual node in a first physical node; selecting one of a plurality of virtual nodes operated in a second physical node as a node for taking over resources related to a service through a failover process; and taking over resources related to the service through the selected virtual node.

Advantageous Effects

A virtualization based high availability cluster system and a method for managing failures in a virtualization based high availability cluster system according to the present invention can provide a high availability service using a small number of physical nodes. That is, the high availability cluster system according to the present invention improves the reliability of a system providing a service and requires a low management cost while not degrading the efficiency of a node although virtual nodes for providing a service increase in number. Therefore, the high availability cluster system according to the present invention can effectively overcome the problems of the high availability system according to the related art, such as low availability, low resource utilization, and software or hardware failure.

Also, the virtualization based high availability cluster system and a method for managing failure in a virtualization based high availability cluster system according to the present invention can provide stable services through high extendibility for progressing services related to very important business task or Infra related service and have high efficiency, thereby requiring a low management cost by combining the extendibility of a 1+M high availability system according to the related art and the efficiency of a virtualization platform based high availability system according to the related art.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings:

FIG. 1 is a diagram illustrating a 1+1 high availability system according to the related art;

FIG. 2 is a diagram illustrating a 1+m high availability system according to the related art;

FIG. 3 is a block diagram illustrating a virtualization based high availability cluster system with a first failure generated according to an embodiment of the present invention;

FIG. 4 is a diagram illustrating a high availability cluster system supporting a virtualization based extendibility with a second failure generated according to an embodiment of the present invention; and FIG. 5 is a flowchart illustrating a method for managing a failure in a high availability cluster system according to an embodiment of the present invention.

BEST MODE FOR CARRYING OUT THE INVENTION

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

A high availability cluster system according to an embodiment of the present invention will be described with reference to FIG. 3. FIG. 3 is a block diagram illustrating a virtualization based high availability cluster system with a first failure generated according to an embodiment of the present invention.

As shown in FIG. 3, the high availability cluster system according to the present embodiment includes a plurality of virtualized physical nodes 300-1 and 300-2, and a plurality of virtual nodes 310-1 to 310-N and 320-1 to 320-N respectively included in the physical nodes 300-1 and 300-2 and operated in each virtual platform, and message generators 350-1 and 350-2 respectively included in the physical nodes 300-1 and 300-2 at a virtualization platform. A plurality of the virtual nodes 310-1 to 310-N and 320-1 to 320-N include high availability managers 330-1 to 330-N and 340-1 to 340-N, respectively, for generating a message for informing all virtual nodes of no failure generated.

Particularly, FIG. 3 shows the high availability system operates with one active node 310-1 and a plurality of backup nodes 310-2 to 310-N and 320-1 to 320-N at a virtual node level. When a failure is generated in the active node 310-1, a backup node that performs a failover process for taking over resources related a service operates as an active node. Therefore, the assignment of the active node may vary according to a location and a time of failure generation.

Messages generated in the message generators 350-1 and 350-2 and high availability managers 330-1 to 330-N and 340-1 to 340-N may be a HEARTBEAT message.

The message generators 350-1 and 350-2 generate a message for informing that all of virtual nodes in a physical node are in a normal state and transfer the generated message to all of the virtual nodes 310-1 to 310-N and 320-1 to 320-N in each of the physical nodes 300-1 and 300-2 regardless of the states thereof.

If a failure is generated in the active node 310-1, the backup nodes 310-2 to 310-N in the active node 310-1 cannot recognize the failures of the active node 310-1 due to a signal generated from the message generator 350-1, which indicates a normal state of the active node 310-1.

Finally, only the backup nodes 320-1 to 320-N in the physical node 300-2, which is physically different from the active node 310-1 having the failures, recognize that the failures are generated in the active node 310-1. One of the backup nodes 320-1 to 320-N is selected and the selected backup node takes over resources related to a service provided from the active node 310-1 through a failover process. That is, the selected backup node operates as an active node.

Hereinafter, a high availability cluster system according to an embodiment of the present invention will be described with reference to FIG. 4. FIG. 4 is a diagram illustrating a high availability cluster system supporting a virtualization based extendibility with a second failure generated according to an embodiment of the present invention.

Like the description of FIG. 3, only backup nodes 410-2 to 410-N in a physical node 400-1, which is physically different from an active node 440-1 having failure, recognize that the failures are generating in the active node 440-1. One of the backup nodes 410-2 to 410-N which recognize the failure is selected. The selected backup node transits its state as an active node and takes over resources related to a service through a failover process.

Hereinafter, a method for managing a failure in a high availability cluster system according to an embodiment of the present invention will be described with reference FIG. 5. FIG. 5 is a flowchart illustrating a method for managing a failure in a high availability cluster system according to an embodiment of the present invention.

At step S501-1, it is determined whether an object operated in a first physical node is a message generator or not. If the object is not the message generator, a cluster membership is formed at step S510-2 because the object is a virtual node. Then, the object inputs a virtual platform as a virtual node of a high availability system at step S510-3.

At step S520-1, it is determined whether the virtual is an active node or not. If it is determined as the active node, a heartbeat message for an active node is generated at step S510-4. At step S510-5, it is determined whether a termination signal is inputted or not. If the termination signal is not inputted, the heartbeat message is continuously generated at step S510-4. If the termination signal is inputted, a state is transited to a termination state at step S500-2.

If the virtual node is not an active node at the step S520-1, it means that the object is a backup node. That is, a heartbeat message for the backup node is generated at step S520-2. While monitoring the active node at step S520-3, it is determined whether a signal indicating that a failure is generated in an active node is inputted or not at step S530-1.

If the signal indicating the failure generation is inputted, one of backup nodes forming a physical node that is not the first physical node is selected as an active node at step S530-2.

Each of the backup nodes determines whether oneself is selected as an active node or not at step S540-1. Backup nodes, which are not selected as an active node, continuously generate a heartbeat message at step S520-2. A backup node selected as an active node performs a failover process as an active node and obtains resources related to a service at step S540-2.

If the signal indicating the failure generation is not inputted, it is determined whether a termination signal is inputted at step S550-1. If the termination signal is not inputted, a heartbeat message is continuously generated at step S520-2. If the termination signal is inputted, the process is ended at step S520-2.

If the object in the first physical node is determined as a message generator at the step S510-1, a list of virtual nodes in the first physical node is confirmed from a virtual platform at step S560-1 and a heartbeat message is generated for the confirmed virtual nodes at step S560-2. Then, the generated messages are transmitted to the confirmed virtual nodes at step S560-3. It is determined whether a message received after transmitting the message is a termination signal or not at step S570-1. If the message is the termination signal, a state is transited to a termination state at step S500-2.

While the present invention has been described with respect to certain preferred embodiments, it will be apparent to those skilled in the art that various changes and modifications may be made without departing from the scope of the invention as defined in the following claims.

The invention claimed is:

1. A high availability cluster system comprising:
   a plurality of virtual nodes; and
   a plurality of physical nodes each including a message generator for generating a message denoting that the virtual nodes are in a normal state and transmitting the generated message to virtual nodes in a same physical node,
   wherein one of the virtual nodes not included in a first physical node among the plurality of the physical nodes takes over resources related to a service if a failure is generated in one of the virtual nodes included in the first physical node.

2. The system of claim 1, wherein each of the virtual nodes includes a high availability manager for generating a message that informs all of the virtual nodes that a failure is not generated in a corresponding virtual node and transmitting the generated message to virtual nodes in the same physical node.

3. A method for managing failure in a high availability cluster system comprising the steps of:
   generating a message denoting that a plurality of virtual nodes are in a normal state,
   transmitting the generated message to virtual nodes in a same physical node,
   detecting a failure in a first virtual node in a first physical node;
   selecting one of the plurality of virtual nodes operated in a second physical node as a node for taking over resources related to a service through a failover process; and
   taking over resources related to the service through the selected virtual node.

4. The method of claim 3, further comprising the step of: at the plurality of virtual nodes operated in a physical node except the first physical node, recognizing that failures are generated in the first virtual node.

5. The method of claim 3, further comprising the step of: at one of the virtual nodes except the first virtual node among the plurality of virtual nodes included in physical nodes except the second physical node, taking over resources related to the service if a failure is generated in the selected virtual node.

* * * * *